United States Patent [19]

Ellis et al.

[11] Patent Number: 4,629,941
[45] Date of Patent: Dec. 16, 1986

[54] DIFFERENTIAL ILLUMINATION SENSITIVE SWITCHING CIRCUIT

[76] Inventors: Edward H. Ellis; Marilyn S. Ellis, both of 4022 Wandsworth Rd., South Euclid, Ohio 44121

[21] Appl. No.: 689,315

[22] Filed: Jan. 7, 1985

[51] Int. Cl.$^4$ .............. H05B 37/02; H05B 39/04; H05B 41/36
[52] U.S. Cl. ................... 315/153; 315/155; 315/156; 315/159; 250/206
[58] Field of Search .............. 315/153, 155, 156, 159; 250/151, 206

[56] References Cited

U.S. PATENT DOCUMENTS

| | | | |
|---|---|---|---|
| 1,774,457 | 8/1930 | Singleton. | |
| 2,096,902 | 10/1937 | Lamb | 250/41.5 |
| 2,807,752 | 9/1957 | McIlvaine | 315/83 |
| 3,089,065 | 5/1963 | Worden | 317/130 |
| 3,160,757 | 12/1964 | McAllise | 250/209 |
| 3,421,005 | 1/1969 | Baker | 315/159 |
| 3,502,883 | 3/1970 | Archer | 250/210 |
| 3,601,614 | 8/1971 | Platzer, Jr. | 250/209 |
| 3,636,357 | 1/1972 | Del Zotto | 315/159 |
| 3,790,848 | 2/1974 | Lai | 315/155 |
| 3,896,345 | 7/1975 | Zink | 317/134 |
| 3,901,813 | 8/1975 | Potopinski | 315/155 |
| 3,965,388 | 6/1976 | Brisk | 315/155 |
| 4,090,107 | 5/1978 | Seib | 315/159 |

OTHER PUBLICATIONS

"Light-Operated Bistable Switch" by David C. Conner Mar. 1971 Popular Electronics, p. 70.
"Automatische Hofbeleuchtungsanlage" by Die Schaltung Dec. 1978 Funkschau, pp. 1301-1302.

Primary Examiner—Saxfield Chatmon
Attorney, Agent, or Firm—Fay, Sharpe, Fagan, Minnich & McKee

[57] ABSTRACT

A first phototransistor (20, 20') is mounted on the structure such as a home (12) or a garage (14) to sense the level of ambient illumination. A second phototransistor (22, 22') senses both the level of ambient illumination and illumination from the headlights of an approaching vehicle or the like. The phototransistors are arranged with a pair of resistors (54, 56) in a balanced bridge (50). A central bridge junction (52) assumes a higher potential when both phototransistors are illuminated the same, whether light or dark, and a lower potential when the second phototransistor is illuminated more brightly than the first. In response to the uneven illumination of the phototransistors, a timer (60) produces an output signal for a preselected duration. An optic coupler (90) gates a triac (92) conductive for the preselected duration of the timer. The triac is connected in series with exterior security lights (24, 24') for illuminating the area adjacent a driveway, home, and garage to provide a lighted path for the vehicle occupant after disembarkation of the vehicle.

13 Claims, 2 Drawing Figures

DIFFERENTIAL ILLUMINATION SENSITIVE SWITCHING CIRCUIT

BACKGROUND OF THE INVENTION

The present invention relates to light actuated switching circuitry. The present invention finds particular application in the actuation of house lights and other electrical devices in response to the headlights of an approaching vehicle and will be described with particular reference thereto. It is to be appreciated, however, that the present invention is also applicable to the actuation of other lights and electrical devices in response to differential illumination of various origins.

Many older homes have detached garages which are commonly located to the rear of the home. Illumination for the garage and driveway area is commonly provided by floodlights mounted on the home, particularly when the garage is not electrified. Vehicles entering the garage after dark, commonly rely only upon the illumination of their headlights. After shutting off the car, the driver and passengers are left in the dark to close the garage and walk to the home.

This lack of illumination provides both a safety and a security risk. If the detached garage is electrified, it may be provided with a radio controlled garage door opener. However, such garage door openers do not cure the above-referenced problems. First, radio controlled garage door openers commonly only illuminate the interior of the garage. Even if the radio controlled garage door opener was specially modified to provide exterior security lighting, such security lighting would only illuminate the neighborhood of the garage. Without the security lighting on the home, only a portion of the driveway may be illuminated. Moreover, upon exiting the garage and closing the door, the driver and passengers are normally left in the dark to walk to the home.

Further, the prior art radio controlled garage door openers only provide illumination for those with an appropriately encoded radio transmitter. Visitors, who park in the driveway, are not provided with illumination as they walk from their car to the home. Further, no response is provided to vehicles entering the driveway which would give the appearance that someone is at home.

In accordance with the present invention, a differential illumination sensitive switching circuit is provided for illuminating the driveway and garage areas in response to the headlights of an approaching vehicle, or the like.

SUMMARY OF THE INVENTION

In accordance with a first aspect of the present invention, the differential illumination sensitive switching circuit is provided. A controlled switch selectively supplies electrical power to an associated electrical device, such as home and garage security lighting. A timing means selectively closes the controlled switch for a selected duration. An illumination sensitive bridge includes at least two electrical devices whose conductive properties are selectively altered as a function of received illumination. The illumination sensitive bridge enables the timing means to close the controlled switch in response to one of the illumination sensitive devices receiving a different level of illumination than the other. In this manner, if the illumination sensitive bridge is mounted such that one of the devices is illuminated by the headlights of an approaching vehicle and the other is not, the controlled switch will be closed in response to approaching vehicle headlights. Yet, when both illumination sensitive devices are illuminated during the day or when both are dark during the night, the controlled switch remains open.

In accordance with a more limited aspect of the present invention, the differential illumination sensitive switching circuit includes a DC power supply for providing DC electric power across a high potential and a low potential output. A first light sensitive solid state device and a first resistor are operatively connected in parallel between the high potential output and a bridge junction. A second light sensitive device and a second resistor are operatively connected in series between the bridge junction and the low potential output. A timer for producing a timer output signal of a selected duration on a timer output has a trigger input operatively connected with the bridge junction. A controlled switch is operatively connected with the timer output to be gated conductive in response to the timer output signal.

One advantage of the present invention is that it provides security and safety to family members by automatically providing illumination for approaching vehicles.

Another advantage of the present invention is that it facilitates entering the home by providing illumination adjacent the door and lock area.

Yet another advantage of the present invention is that it deters burglars by responding automatically to the entry of a vehicle into the driveway, just as if the home were occupied.

BRIEF DESCRIPTION OF THE DRAWINGS

The present invention may be embodied in various components and combinations of components. The figures are only for purposes of illustrating a preferred embodiment of the invention and are not to be construed as limiting it.

DETAILED DESCRIPTION OF THE PREFERRED EMBODIMENT

Figure 1:
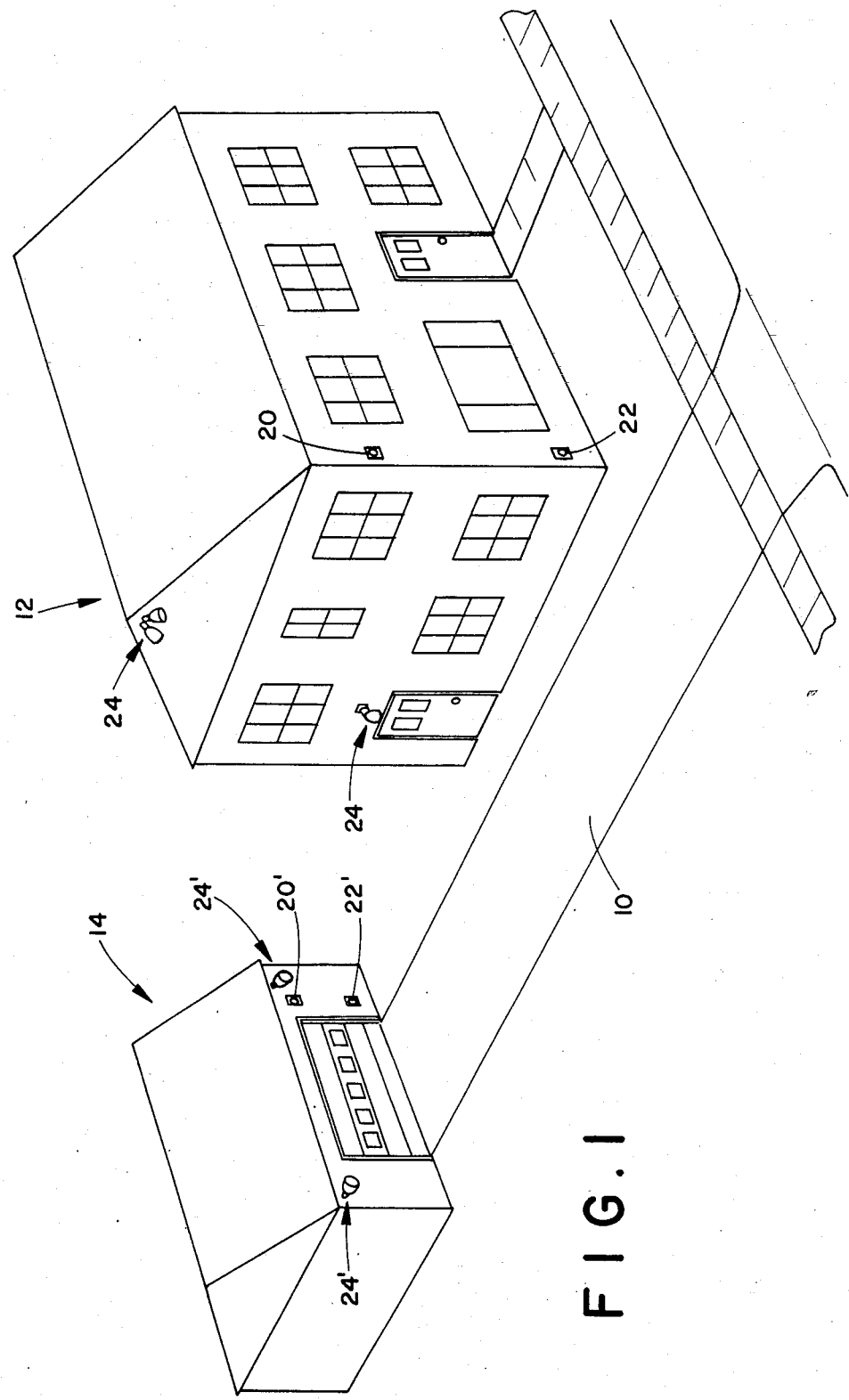
FIG. 1 is illustrative of the present invention in combination with an automatic lighting system for a home with a detached garage; and, FIG. 2 is a circuit diagram of a switching circuit in accordance with the present invention.

With reference to FIG. 1, a driveway 10 extends from the street past a home 12 to a detached garage 14. A first illumination sensitive device 20 is mounted on the home 12 to receive ambient atmospheric illumination but not light from headlights of a vehicle travelling along the driveway. A second illumination sensitive device 22 is mounted to receive ambient atmospheric illumination and lights from vehicular headlights.

When both illumination sensitive devices receive generally the same amount of illumination, such as from full sun during the day, night time darkness, dawn or dusk dim illumination, or the like, the circuit is quiescent. However, when one of the light sensitive devices receives significantly more illumination than the other, the circuit of FIG. 2 causes security and safety lights 24 to be powered for preselected duration, e.g. 5-10 minutes. In this manner, whenever a vehicle with its headlights illuminated pulls into the driveway, the present invention responds automatically by turning on the security and safety lights which illuminate the driveway and surrounding area.

With continuing reference to FIG. 1, a second pair of illumination sensitive devices 20′, 22′ are mounted on the detached garage 14 such that both devices receive substantially equal illumination from ambient atmospheric light. However, one of the sensors, notably lower mounted sensor 22′, is disposed to receive a greater amount of illumination from headlights of an approaching vehicle. In response to the light sensitive devices 20′, 22′, a circuit in accordance with FIG. 2 disposed in the garage causes safety and security lamps 24′ to be illuminated for a preselected duration. Thus, when a vehicle with its headlights on drives down the driveway to the garage, the safety and security lighting 24′ brightly illuminates the area around the vehicle, the garage, and the home. This provides the occupants of the vehicle with the opportunity to survey the surrounding area for prowlers, with illumination while unlocking and opening the garage door, with illumination while walking from the garage to the home, and with illumination while unlocking the home door.

Figure 2:
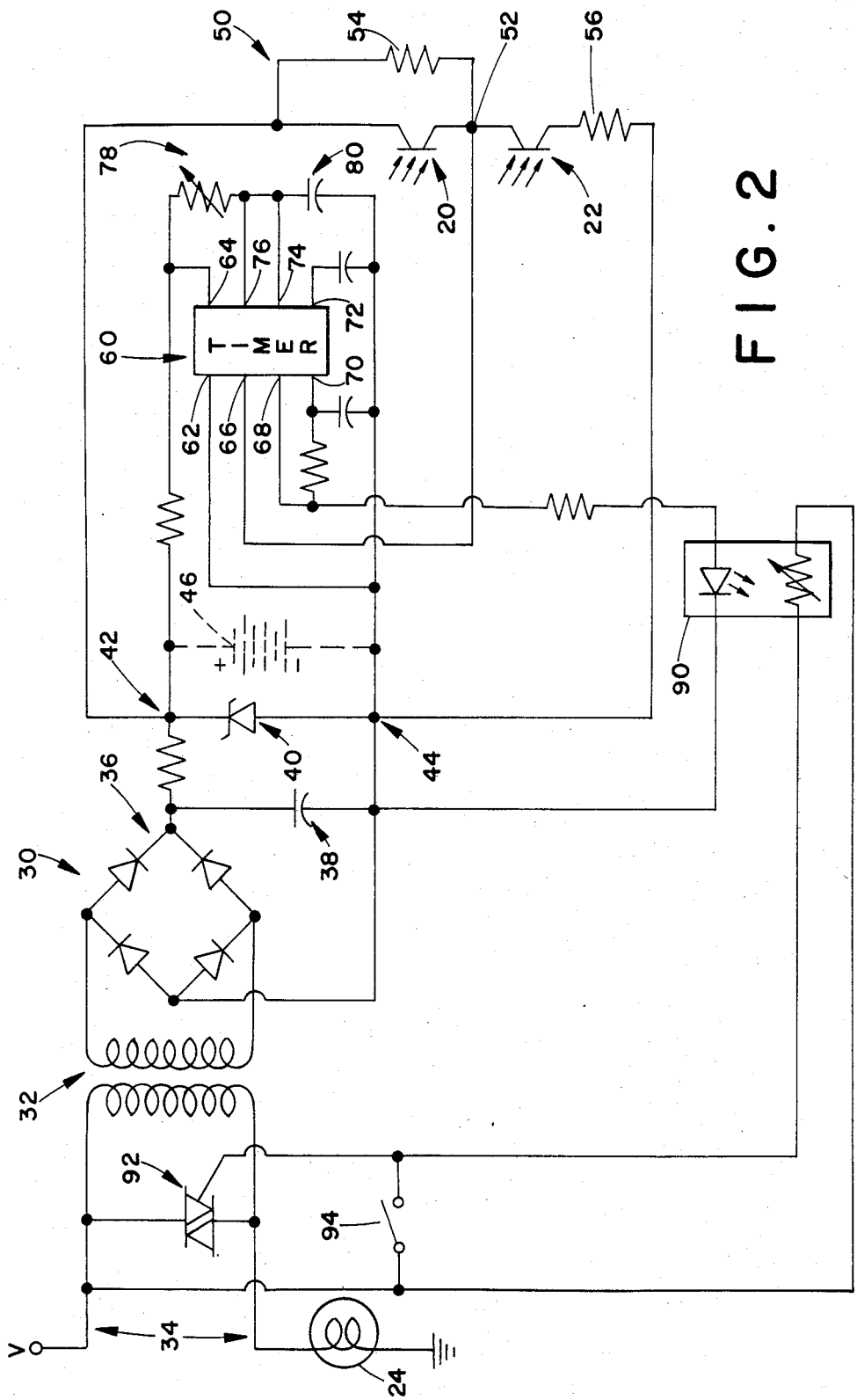

With reference to FIG. 2, the differential illumination sensitive switching circuit includes a DC power supply 30. In the preferred embodiment, the power supply includes a transformer 32 which is connected by lead wires 34 with the home wiring in an existing wall switch box, i.e. the circuit replaces a conventional wall switch. In this manner, the primary of the transformer is connected in series between the source of a.c. potential and the security lights 24. The transformer provides both electrical isolation and a power reduction from electrical power on the home wiring. A full wave rectifier 36, a charged storing capacitor 38, and a Zener diode 40 provide a constant DC voltage across a high potential output 42 and a low potential output 44. Optionally, a battery 46, such as a rechargeable Ni-Cd battery, may be connected across the high and low potential outputs. The battery maintains a constant biasing potential for the full duration that the security lights are actuated, which constant potential maintains florescent and mercury vapor lights illuminated without flickering.

A light sensitive device balanced bridge arrangement 50 includes the first illumination sensitive device 20 connected between the high potential output 42 and a bridge junction 52. The first light sensitive device is preferably a solid state device which becomes more conductive when brightly illuminated than when dark, such as a phototransistor, a photodiode, a photoresistor, or the like. A first electrical resistance 54 is connected in parallel with the first phototransistor 20 between the high potential output 42 and the bridge junction 52. The second light sensitive device 22 is connected in series with a second resistor 56 between the bridge junction 52 and the low potential output 44. The second light sensitive device is preferably a phototransistor or other solid state device that is more conductive under bright illumination than when dark, e.g. a photodiode, a photoresistor, or the like.

In the preferred embodiment, the first resistor 54 is about 6.8K and the second resistor is about 100 ohms. To provide good circuit stability, the first resistor has at least twice the resistance and preferably at least ten times the resistance as the second resistor.

A timer 60 is responsive to an enable signal from the bridge circuit 50 to provide a timer output signal of a selected duration. More specifically, the timer includes a first power input 62 connected with the low potential output of the power supply and a second power input 64 connected with the high potential output. A trigger input 66 is connected with the bridge junction 52 to enable the timer in response to a relatively low potential on the bridge junction 52, i.e. a low potential enable signal. An output terminal 68 carries a timed output signal for the selected duration after receipt of the enable signal on the trigger terminal 66. The output terminal 68 feeds back a portion of the output voltage to a reset terminal 70 to hold the timer in its actuated state. The reset terminal 70 is capacitively coupled with the low potential output such that a miscellaneous voltage spike does not inadvertently actuate or trigger the timer. A control voltage terminal 72 is capacitively coupled to the low potential output to prevent mistriggering of the timer. In this manner, a pulse stabilization means is provided for stabilizing the timer against actuation in response to a stray voltage pulse. Threshold and discharge terminals 74, 76 are connected with an RC timing circuit 78, 80 for selectively adjusting the duration of the timer output pulse. By selectively adjusting the RC time constant, the duration of the timer output signal is selectively adjustable.

The timer output terminal 68 is connected with an electrical isolation relay 90. In the preferred embodiment, the isolation relay is an optic relay to isolate the timer and associated circuitry from a controlled switch 92. The controlled switch, such as a triac, is connected across the lead wires 34 to short the transformer 32 and supply power to the security lighting 24, 24′ or other associated electrical devices. In this manner, a signal from the timer output causes the isolation relay 90 to supply power to the gate of the triac 92. When the optional battery 46 is absent, shorting the transformer cuts power to the circuit and the optic coupler 90 removing the gate signal from the controlled switch 92. The capacitors 38 and 80 hold sufficient potential to continue powering the timer 60. The controlled switch 94 becomes non-conductive near the end of the AC cycle allowing power to be supplied to the DC power supply. The timer, which is still powered, enables the now powered optic coupler 90 to gate the triac 92 conductive. In this manner, the triac opens for a short period during each AC line cycle to time share the AC power between the circuit and the security lights 24. When battery 46 is present, it supplies the operating power and the triac is held continuously conductive for the timed duration.

To enable the security lights or other electrical device to be manually enabled and the timed duration to be foreshortened, a manual switch 94 is mounted as may be convenient to provide electrical power to the triac gate.

In operation, when neither phototransistor is illuminated, both phototransistors appear substantially as an open circuit. The bridge junction 52, hence trigger terminal 66, is connected by the first resistor 54 with the high potential output. Thus, the trigger terminal receives a relatively high potential when neither phototransistor is illuminated.

Analogously, when both phototransistors are fully illuminated to their saturation mode, both appear as short circuits. The bridge junction 52, hence the trigger terminal 66, is connected directly to the high potential output 42 and connected by resistor 56 with the low potential output. In this manner, when both phototransistors are illuminated, the trigger terminal 64 again receives the high potential.

Similarly, when both phototransistors are partially illuminated to the same degree, the bridge circuit functions as a voltage divider. It will be seen that the net resistance of the parallel connected first partially conductive phototransistor and first resistor is always less than the resistance of the series connected second equally, partially conductive phototransistor and second resistor. Thus, a relatively high potential is maintained at the bridge junction when both phototransistors are partially illuminated to the same degree.

However, when the second phototransistor 22 is illuminated significantly more than the first phototransistor, the potential at the bridge junction 52 drops substantially to the low potential, providing an enable signal to the trigger terminal 66. Specifically, when the first phototransistor is dark and the second phototransistor 22 is light, the voltage at the bridge junction 52 is effectively determined by a voltage divider defined by the first, relatively large resistor 54 and by the second, relatively small resistor 56. Because the first resistor is preferably about ten times the resistance of the second resistor, the voltage at the bridge junction 52 is brought sufficiently close to the low potential to trigger the timer 60.

The invention has been described with reference to the preferred embodiment. Obviously, modifications and alterations will occur to others upon reading and understanding the preceeding detailed description. It is intended that the invention be construed as including all such alterations and modifications in so far as they come within the scope of the appended claims or the equivalents thereof.

Having thus described the preferred embodiment, our invention is now claimed to be:

1. For combination with existing A.C. electrical wiring of a building, which wiring includes a wall switch box that has an A.C. power lead that is connected with a source of electrical power and a controlled lead that is connected with wiring that runs from the switch box through walls of the building to a light fixture further wiring in the walls of the building connects the light fixture with ground; a differential illumination switching circuit comprising:
   a transformer having a primary winding connecting across the power and controlled leads;
   a triac connected in parallel with the primary winding across the power and control leads, whereby the light fixture is connected between the parallel connected triac and primary winding and ground;
   a D.C. power supply circuit connected with a secondary winding of the transformer for providing D.C. electric power, the D.C. power supply circuit having a high potential output and a low potential output;
   a first light sensitive solid state device operatively connected between the high potential output and a bridge junction;
   a first resistor operatively connected in parallel with the first light sensitive device between the high potential output and the bridge junction;
   a second light sensitive solid state device operatively connected between the bridge junction and the low potential output;
   a timing means for producing a timer output signal of a selected duration on a timer output in response to receiving a low potential signal on a trigger input, the trigger input being operatively connected with the bridge junction;
   an electrical isolation means operatively connected with the timing means to be gated to a conductive state by the timer output signal, the isolation means being operatively connected between the power lead and a gate of the triac, such that the triac oscillates between conductive and non-conductive states with each cycle of A.C. power, whereby (i) during one portion of each A.C. cycle, the triac shorts the primary winding and conducts A.C. power to the light fixture and (ii) during another portion of each A.C. cycle, the triac is non-conductive permitting the A.C. power to flow through the primary winding to provide electric power to the D.C. power supply circuit, the first and second light sensitive solid state devices, and the timing means.

2. The switching circuit as set forth in claim 1 further including a second resistor connected in series with the second light sensitive device.

3. The switching circuit as set forth in claim 2 wherein the first resistor has at least twice the resistance as the second resistor.

4. The switching circuit as set forth in claim 3 wherein the first resistor has at least ten times the resistance of the second resistor.

5. A differential illumination sensitive switching system for selectively actuating at least one security light mounted on the exterior of a building to provide illumination adjacent a vehicular approach to the building in response to approaching vehicle headlights or the like, the system comprising:
   a reference light sensitive solid state device which is biased to vary in conductivity with variations in brightness of illumination, the reference light sensitive device being mounted on the exterior of the building such that it senses ambient illumination without sensing significant illumination from approaching headlights, the reference light sensitive solid state device being operatively connected between a source of high electrical potential and a bridge junction such that a level of electrical potential provided to the bridge junction is increased in proportion to the sensed brightness of the ambient illumination;
   a first resistive means operatively connected in parallel with the reference light sensitive device between the high potential source and the bridge junction to conduct the high electrical potential to the bridge junction even in darkness when the reference light sensitive device is non-conductive;
   a headlight sensing light sensitive solid state device which is biased to vary in conductivity with variations in brightness of sensed illumination, the headlight sensing light sensitive device being mounted on the exterior of the building such that it receives both ambient exterior illumination and illumination from the headlights of approaching vehicles, the headlight sensing light sensitive device being operatively connected between the bridge junction and the low potential source such that the electrical potential level of the bridge junction is reduced in proporation to the combined brightness of sensed ambient illumination and approaching headlights;
   the bridge junction assuming a higher potential level when both the reference and headlight sensing light sensitive devices are receiving substantially the same level of ambient illumination and assuming a lower potential level when the headlight sensing light sensitive device is more brightly illuminated than the reference light sensitive device, such that the bridge junction assumes the higher potential level over a wide range of light and dark ambient illumination levels and assumes the lower potential level when the sensors are illuminated at different levels regardless of ambient illumination level;

a timing means for gating a controlled switch conductive for a selected duration in response to the bridge junction assuming the lower potential, the timing means being operatively connected with the bridge junction and the controlled switch;

the security light being connected with the controlled switch such that the security light is turned on while the controlled switch is gated conductive by the timing means, whereby in response to the headlights of a vehicle approaching the building in any level of ambient illumination, the security light is turned on just as if the building were occupied by a person watching for approaching vehicles to provide illumination for the selected duration adjacent the approaching vehicle for the security and safety of a vehicle component disembarking therefrom.

6. The system as set forth in claim 1 further including an isolation coupling for operatively connecting the timing means with the controlled switch while maintaining the electrical isolation therebetween.

7. The system as set forth in claim 1 further including a voltage pulse stabilization means for stabilizing the timing means against closing the controlled switch in response to a stray voltage pulse.

8. The system as set forth inc claim 1 further including selected duration adjusting means for selectively adjusting the selected duration for which the controlled switch is closed.

9. The system as set forth in claim 5 further including:
a second resistor operatively connected in series with the headlight sensing light sensing device between the bridge junction and the source of low potential.

10. The system as set forth in claim 9 wherein the first resistor has at least twice the resistance of the second resistor.

11. The switching circuit as set forth in claim 5 wherein the timing means includes a voltage pulse stabilization means for stabilizing the timing means from being enabled by a voltage spike to produce the timer output.

12. The switching circuit as set forth in claim 11 wherein the timing means further includes means for selectively adjusting the selected duration of the timer output.

13. The switching circuit as set forth in claim 5 wherein the electrical isolation means includes an optic coupler.

* * * * *